US008494766B2

(12) United States Patent
Walter

(10) Patent No.: US 8,494,766 B2
(45) Date of Patent: Jul. 23, 2013

(54) FLIGHT MANAGEMENT SYSTEM WITH INTEGRATED TACTICAL COMMANDS FOR USE WITH AN AIRCRAFT AND METHOD OF OPERATING SAME

(75) Inventor: Randy Lynn Walter, Ada, MI (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 77 days.

(21) Appl. No.: 12/986,838

(22) Filed: Jan. 7, 2011

(65) Prior Publication Data
US 2012/0179368 A1 Jul. 12, 2012

(51) Int. Cl.
*G01C 21/00* (2006.01)
*G05D 1/00* (2006.01)

(52) U.S. Cl.
USPC ........... 701/465; 701/467; 701/120; 701/122; 340/972; 340/961; 340/945

(58) Field of Classification Search
USPC .......... 701/206, 465, 467, 120, 122; 340/972; 244/182
See application file for complete search history.

(56) References Cited

U.S. PATENT DOCUMENTS

| | | | |
|---|---|---|---|
| 4,357,661 A | 11/1982 | Lambregts et al. | |
| 4,797,674 A | 1/1989 | Zweifel et al. | |
| 6,711,479 B1 * | 3/2004 | Staggs | 701/16 |
| 6,731,226 B2 * | 5/2004 | Walter | 340/972 |
| 6,862,519 B2 * | 3/2005 | Walter | 701/120 |
| 6,873,903 B2 * | 3/2005 | Baiada et al. | 701/120 |
| 7,366,591 B2 * | 4/2008 | Hartmann et al. | 701/4 |
| 7,676,303 B2 * | 3/2010 | Hanel | 701/3 |
| 8,010,267 B2 * | 8/2011 | Klooster et al. | 701/66 |
| 8,027,757 B2 * | 9/2011 | Berard | 701/14 |
| 8,165,734 B2 * | 4/2012 | Wachenheim et al. | 701/7 |
| 8,209,115 B2 * | 6/2012 | Lucas et al. | 701/122 |
| 2003/0102987 A1 * | 6/2003 | Walter | 340/972 |
| 2003/0105581 A1 * | 6/2003 | Walter | 701/120 |
| 2008/0312779 A1 * | 12/2008 | Sacle et al. | 701/7 |
| 2009/0076717 A1 * | 3/2009 | Goutelard et al. | 701/122 |
| 2010/0100308 A1 * | 4/2010 | Coulmeau et al. | 701/122 |
| 2010/0168936 A1 * | 7/2010 | Caillaud et al. | 701/5 |
| 2010/0198433 A1 * | 8/2010 | Fortier et al. | 701/14 |
| 2010/0217510 A1 | 8/2010 | Deker | |
| 2010/0292871 A1 * | 11/2010 | Schultz et al. | 701/3 |
| 2011/0270470 A1 * | 11/2011 | Svoboda et al. | 701/3 |
| 2012/0022778 A1 * | 1/2012 | Mishra | 701/206 |
| 2012/0035841 A1 * | 2/2012 | Polansky et al. | 701/120 |
| 2012/0059535 A1 * | 3/2012 | Jackson et al. | 701/3 |
| 2012/0130626 A1 * | 5/2012 | Klooster et al. | 701/120 |
| 2012/0179368 A1 * | 7/2012 | Walter | 701/465 |

* cited by examiner

*Primary Examiner* — Thomas Black
*Assistant Examiner* — Wae Louie
(74) *Attorney, Agent, or Firm* — David J. Clement, Esq.; Armstrong Teasdale LLP

(57) ABSTRACT

A flight management system for use in automatically generating a flight path trajectory for an aircraft. The flight path trajectory includes a plurality of waypoints and a plurality of vectors that extend between each waypoint of the plurality of waypoints. The flight management system includes a processor that is configured to calculate a first flight path trajectory including an origin waypoint and a destination waypoint. A tactical command that indicates a change in flight trajectory is received. A second flight path trajectory based at least in part on the tactical command is calculated. The calculated second flight path trajectory includes a departure waypoint along the first flight path trajectory, an intercept waypoint along the first flight path trajectory, and a departure vector from the departure waypoint to the intercept waypoint.

19 Claims, 5 Drawing Sheets

FLIGHT MANAGEMENT SYSTEM WITH INTEGRATED TACTICAL COMMANDS FOR USE WITH AN AIRCRAFT AND METHOD OF OPERATING SAME

BACKGROUND OF THE INVENTION

The field of the invention relates generally to controlling aircraft in flight, and more specifically, to a flight management system for use with an aircraft and method of operating an aircraft in a controlled airspace.

At least some known aircraft include flight management systems and for generating a flight path from a departure airport to a destination airport and for flying the aircraft along the generated flight path. In today's airspace, delays due to congestion are common. When the number of aircraft entering an airspace exceeds the number of aircraft that can be safely handled by the available Air Traffic resources (limited by the number of controllers and type of automation), delays are imposed on aircraft. These delays are typically achieved by instructing aircraft to reduce speed, using radar vectors, or by orbital holding. Currently, air traffic controllers estimate, based on experience, using an average flight time to determine when to ask an aircraft to leave its current holding pattern in order to meet a time (for metering or merging with other aircraft in a defined arrival sequence) at a point after leaving the hold, such as within the arrival procedure.

At least some known aircraft include an autoflight system that includes a flight management system and a separate autopilot system. Currently, a pilot or navigator receives instructions from the air traffic controller when a delaying maneuver is required and manually enters tactical commands into the autopilot system. The autopilot system abandons the flight path generated by the flight management system, and operates the aircraft through the delay maneuver based on the tactical commands. Because the generated flight path has been abandoned, the intent, or future position of the aircraft becomes uncertain. As a result, the flight time will vary significantly based on where the aircraft leaves a delay maneuver, introducing uncertainty which requires additional separation buffers. This uncertainty results in decreased capacity and increased fuel burn for following aircraft due to their increased time spent in the delaying tactical operation.

In addition, at least some known air traffic controllers may use trajectory based operation methods to maintain aircraft separation. This method requires knowledge of the future aircraft 4-dimensional intent (latitude, longitude, altitude and time). Known autoflight systems do not support trajectory based operation methods because the autopilot system abandons the generated flight path to execute tactical commands received by the air traffic controller.

An integrated autoflight system is needed that eliminates the undesired uncertainty of an aircraft's intent during implementation of tactical commands. Specifically, an autoflight system is needed that generates a flight path that is indicative of the future aircraft trajectory based on tactical commands, and downlinks the flight path trajectory to the ground controllers to provide the ground controllers with a precise picture of the aircraft's position in time and enable controllers to safely merge aircraft traffic with appropriate separation for approach and landing on an active runway.

BRIEF DESCRIPTION OF THE INVENTION

In one embodiment, a flight management system for use in automatically generating a flight path trajectory for an aircraft is provided. The flight path trajectory includes a plurality of waypoints and a plurality of vectors that extend between each waypoint of the plurality of waypoints. The flight management system includes a processor that is configured to calculate a first flight path trajectory including an origin waypoint and a destination waypoint. A tactical command that indicates a change in flight trajectory is received. A second flight path trajectory based at least in part on the tactical command is calculated. The calculated second flight path trajectory includes a departure waypoint along the first flight path trajectory, an intercept waypoint along the first flight path trajectory, and a departure vector from the departure waypoint to the intercept waypoint.

In another embodiment, a method of operating an aircraft that includes a flight management system is provided. The method includes calculating, by the flight management system, a first flight path trajectory including an origin waypoint and a destination waypoint. A tactical command indicating a change in flight trajectory is receiving by the aircraft flying in the first flight path trajectory. The flight management system calculates a second flight path trajectory based at least in part on the tactical command. The calculated second flight path trajectory includes a departure waypoint along the first flight path trajectory, an intercept waypoint along the first flight path trajectory, and a departure vector from the departure waypoint to the intercept waypoint.

In yet another embodiment, an aircraft including a flight management system is provided. The flight management system includes a processor that is configured to calculate a first flight path trajectory including an origin waypoint and a destination waypoint. A tactical command indicating a change in flight trajectory is received. A second flight path trajectory is calculated based at least in part on the tactical command. The calculated second flight path trajectory includes a departure waypoint along the first flight path trajectory, an intercept waypoint along the first flight path trajectory, and a departure vector from the departure waypoint to the intercept waypoint.

DETAILED DESCRIPTION OF THE INVENTION

The exemplary methods and systems described herein overcome at least some disadvantages of known autoflight systems by providing a flight management system that integrates all tactical commands in generating a flight path trajectory. Moreover, the flight management system described herein calculates a flight path trajectory based on a tactical command received from an air traffic controller. By generating a flight path trajectory based on tactical commands, the intent or future position of the aircraft can be determined based on the generated flight path trajectory that enables the air traffic controller to reduce the uncertainty in flight time arrivals and reduce additional separation buffers between aircraft.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
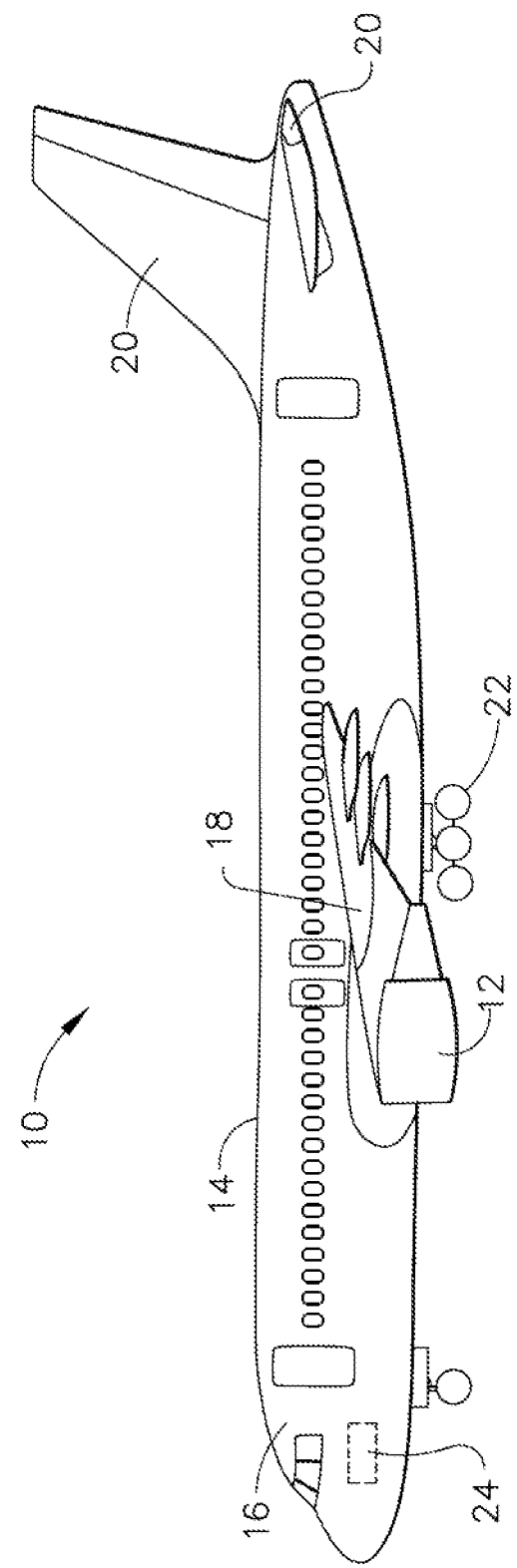
FIG. 1 is a side elevational view of a vehicle such as an aircraft including an exemplary Flight Management System (FMS)

FIG. 1 is a side elevational view of a vehicle 10 such as an aircraft in accordance with an embodiment of the present disclosure. Aircraft 10 includes one or more propulsion engines 12 coupled to a fuselage 14, a cockpit 16 positioned in fuselage 14, wing assemblies 18 extending outward from fuselage 14, a tail assembly 20, a landing assembly 22, a flight management system (FMS) 24 (not visible) for generating a flight path trajectory and flying vehicle 10 along the flight path trajectory, and a plurality of other systems and subsystems that enable proper operation of vehicle 10.

Figure 2:
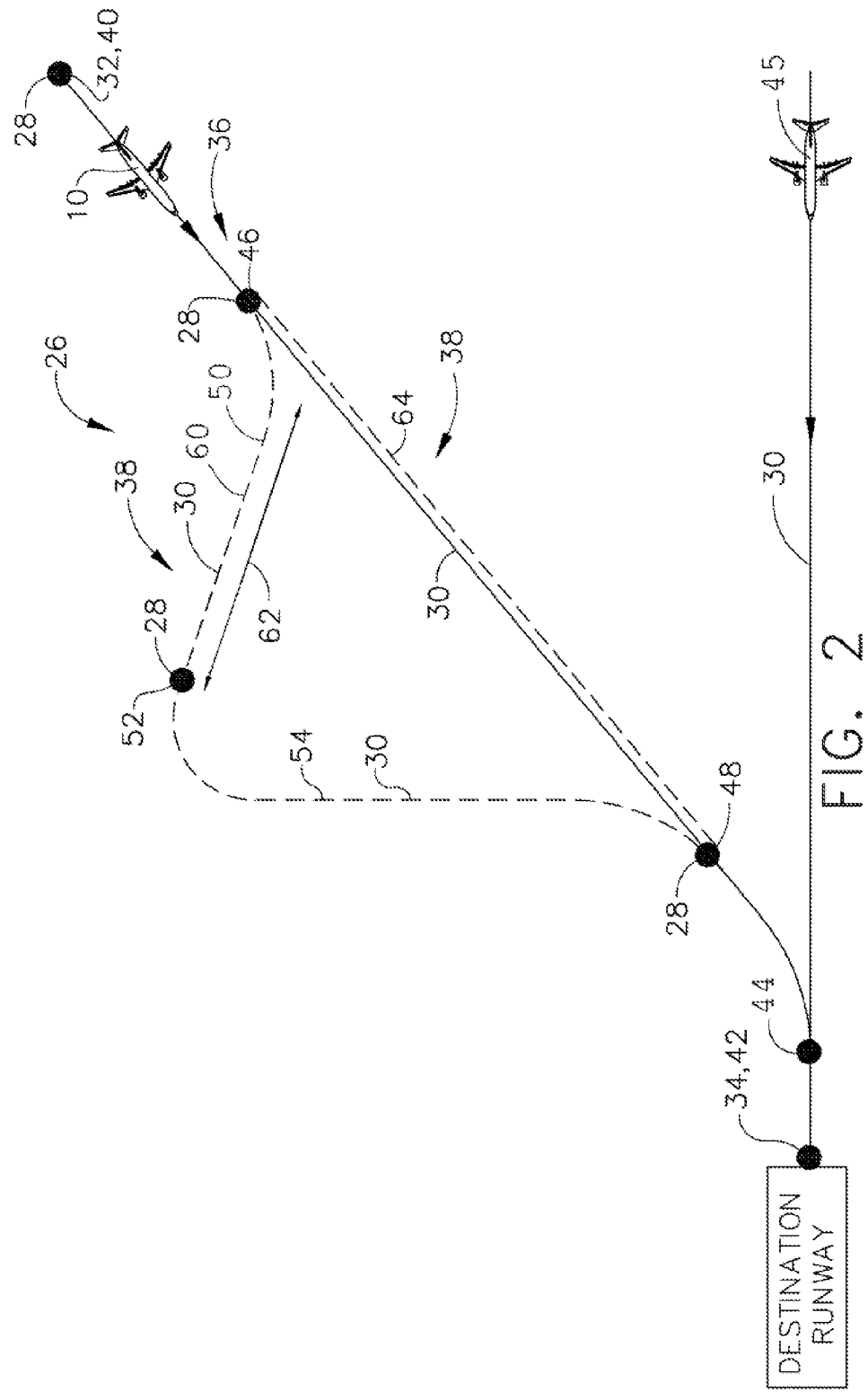
FIG. 2 is a schematic diagram of an exemplary flight path trajectory that is generated by the exemplary FMS from an elevated view above an aircraft.
Figure 3:
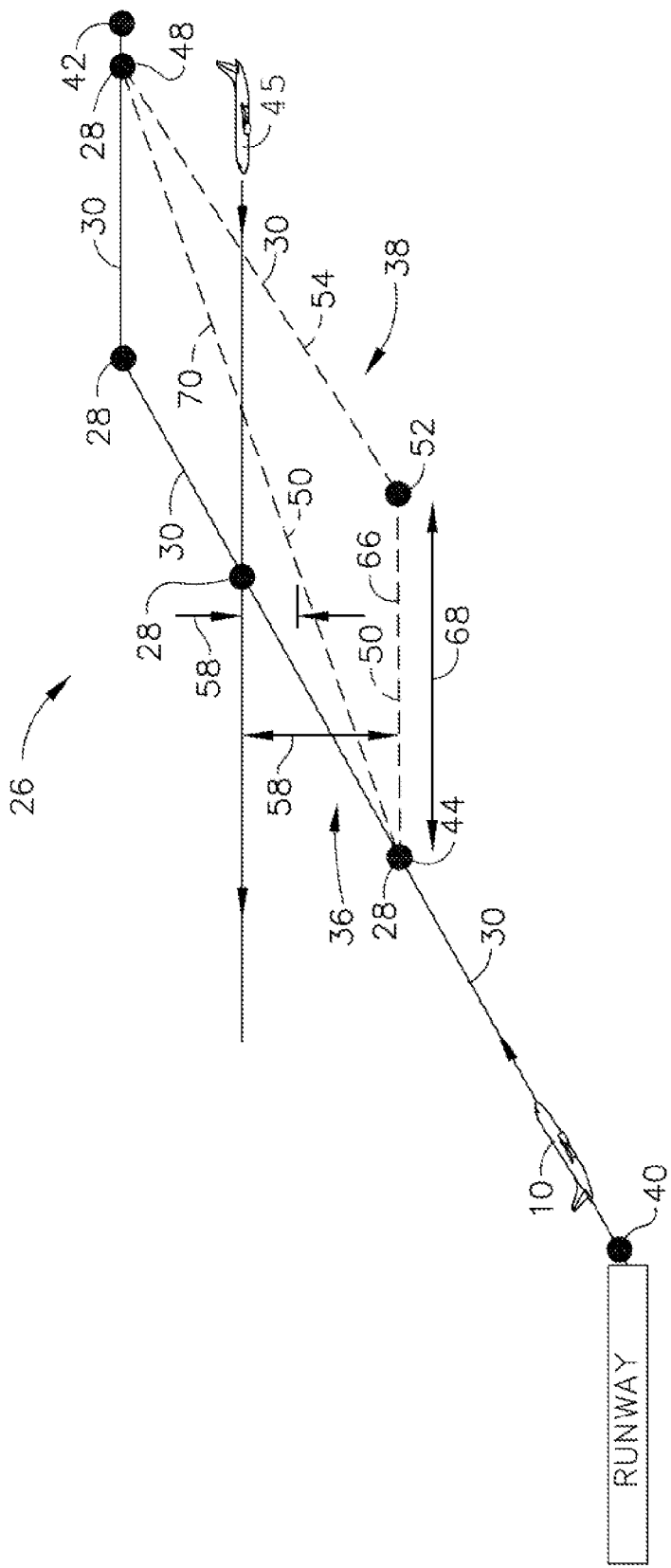
FIG. 3 is another schematic diagram of the flight path trajectory that is generated by the exemplary FMS from a side elevation view of an aircraft.

FIG. 2 is a schematic diagram of a flight path trajectory 26 that is generated by FMS 24 from an elevated view above aircraft 10. FIG. 3 is another schematic diagram of flight path trajectory 26 that is generated by FMS 24 from a side elevation view of aircraft 10. In the exemplary embodiment, FMS 24 is configured to calculate a plurality of flight path trajectories 26. Each flight path trajectory 26 includes a plurality of waypoints 28 and a plurality of vectors 30. Each waypoint 28 includes a position in a 4-dimensional space that includes a point in a 3-dimensional coordinate system and an expected time of arrival. In one embodiment, waypoint 28 may include, for example, a latitude coordinate, a longitude coordinate, and an altitude coordinate. In the exemplary embodiment, each vector 30 extends between adjacent waypoints 28 to define flight path trajectory 26. In one embodiment, vector 30 extends between a first waypoint 32 and a second waypoint 34, and includes a series of maneuvers that are performed by aircraft 10 to enable aircraft 10 to travel from first waypoint 32 to second waypoint 34, such that aircraft 10 arrives at second waypoint 34 at a predefined period of time.

In the exemplary embodiment, FMS 24 is configured to calculate a first flight path trajectory 36 and a second flight path trajectory 38. First flight path trajectory 36 includes a first waypoint, i.e. an origin waypoint 40, a second waypoint, i.e. a destination waypoint 42, and at least one vector 30 from origin waypoint 40 to destination waypoint 42. Destination waypoint 42 may include, for example, an airport, or an approach point. In the exemplary embodiment, first flight path trajectory 36 also includes third waypoint, i.e. a merge waypoint 44 that is between origin waypoint 40 and destination waypoint 42. Merge waypoint 44 includes a point at which first flight path trajectory 36 intersects with a flight path trajectory 26 of an incoming aircraft 45. In the exemplary embodiment, FMS 24 calculates a period of time to complete first flight path trajectory 36 and an estimated time of arrival (ETA) at destination waypoint 42 and/or merge waypoint 44. When inbound traffic exceeds the capability of an airport or airspace, an air traffic controller (ATC) determines an adjusted time of arrival at destination waypoint 42 and/or merge waypoint 44 to provide a predefined period of separation between aircraft 10 and incoming aircraft 45. In the exemplary embodiment, FMS 24 is configured to receive a signal indicative of the adjusted time of arrival at merge waypoint 44, and to calculate second flight path trajectory 38 based at least in part on the adjusted time of arrival. In the exemplary embodiment, FMS 24 is configured to calculate second flight path trajectory 38 to adjust a period of time required to reach merge waypoint 44 such that the aircraft 10 arrives a merge waypoint 44 at the adjusted time of arrival.

In the exemplary embodiment, FMS 24 calculates second flight path trajectory 38 including a departure waypoint 46 along first flight path trajectory 36, an intercept waypoint 48 along first flight path trajectory 36, and a departure vector 50 from departure waypoint 46 to intercept waypoint 48. In one embodiment, second flight path trajectory 38 includes a return waypoint 52 that is between departure waypoint 46 and intercept waypoint 48 such that departure vector 50 begins at departure waypoint 46 and extends to return waypoint 52, and a return vector 54 begins at return waypoint 52 and extends to intercept waypoint 48. In the exemplary embodiment, FMS 24 is configured to calculate second flight path trajectory 38 to depart from first flight path trajectory 36 at departure waypoint 46 and return to first flight path trajectory 36 at intercept waypoint 48.

During operation of aircraft 10, the ATC determines a required time of arrival (RTA) at merge waypoint 44 that is different than the calculated ETA of first flight path trajectory 36. FMS 24 receives a signal indicative of the RTA at merge waypoint 44, and determines the present position of aircraft 10 along first flight path trajectory 36. FMS 24 calculates departure waypoint 46 from first flight path trajectory 36, and calculates second flight path trajectory 38 to include a period of time required to complete second flight path trajectory 38, and calculates an ETA at merge waypoint 44 that is approximately equal to the RTA. FMS 24 calculates the ETA at merge waypoint 44 based on a length of departure vector 50, a length of return vector 54, a speed of aircraft 10, and any external influences, such as, but not limited to, wind speed and direction. In one embodiment, FMS 24 is configured to calculate intercept waypoint 48 along first flight path trajectory 36, and to calculate departure vector 50 to return aircraft 10 to first flight path trajectory 36 after completing second flight path trajectory 38. FMS 24 maneuvers aircraft 10 to enter second flight path trajectory 38 at departure waypoint 46 and to return aircraft 10 to first flight path trajectory 36 at intercept waypoint 48.

In the exemplary embodiment, FMS 24 receives a signal indicative of a tactical command to adjust flight path trajectory 26 of aircraft 10. In one embodiment, the ATC transmits a signal to FMS 24 indicative of the tactical command. Alternatively, a pilot or navigator may input tactical commands into FMS 24 after having received, for example, an appropriate message from the ATC. In the exemplary embodiment, FMS 24 is configured to calculate second flight path trajectory 38 based at least in part on the tactical command. In one embodiment, FMS 24 calculates an ETA at destination waypoint 42 and/or merge waypoint 44 based on the tactical command, and transmit a signal indicative of the calculated ETA to the ATC. The ATC compares the calculated ETA with a required time of arrival, and releases aircraft 10 from the tactical command when the calculated ETA is approximately equal to an RTA at destination waypoint 42 and/or merge waypoint 44. In one embodiment, FMS 24 receives, from the ATC, a signal indicative of a flight path trajectory 56 of incoming aircraft 45 that may intersect first flight path trajectory 36 of aircraft 10. FMS 24 is configured to calculate second flight path trajectory 38 including a clearance distance 58 and or clearance time between incoming aircraft 45 and aircraft 10 to avoid incoming aircraft 45.

In the exemplary embodiment, FMS 24 receives a tactical command including a heading vector command 60. FMS 24 is configured to calculate second flight path trajectory 38 based at least in part on heading vector command 60. In the exemplary embodiment, FMS 24 is configured to calculate departure vector 50 to maintain heading vector command 60 for a predefined period of time 62. FMS 24 is also configured to calculate a time to complete second flight path trajectory 38 and calculate an ETA at a selectable waypoint, such as intercept waypoint 48, destination waypoint 42, and/or merge waypoint 44. Alternatively, FMS 24 is configured to receive a signal indicative of a RTA at destination waypoint 42 and/or intercept waypoint 48, and calculate a period of time 62 to maintain heading vector command 60 to meet a RTA at the intercept waypoint 48 and/or at destination waypoint 42.

In an alternative embodiment, FMS 24 receives a tactical command including an airspeed vector command 64. FMS 24 is configured to calculate second flight path trajectory 38 based on tactical airspeed vector command 64. FMS 24 is also configured to calculate an amount of time to complete second flight path trajectory 38, and calculate an ETA at intercept waypoint 48 and/or at destination waypoint 42.

In one embodiment, FMS 24 receives a tactical command including an altitude vector command 66. FMS 24 is configured to calculate second flight path trajectory 38 based on tactical altitude vector command 66. In the exemplary embodiment, FMS 24 is configured to calculate departure vector 50 to maintain altitude vector command 66 for a predefined period of time 68, and calculate an ETA at intercept waypoint 48 and/or at destination waypoint 42. In one embodiment, FMS 24 is configured to receive a signal indicative of a RTA at destination waypoint 42 and/or at intercept waypoint 48, and calculate a period of time 68 to maintain altitude vector command 66 to meet the RTA at the intercept waypoint 48 and/or at destination waypoint 42. In one embodiment, FMS 24 is configured to calculate departure vector 50 to include a clearance altitude between incoming aircraft 45 and aircraft 10.

In an alternative embodiment, FMS 24 receives a tactical command 70 that includes a flight path angle command or a vertical speed command. FMS 24 is configured to calculate second flight path trajectory 38 based on tactical command 70, and calculate an ETA at intercept waypoint 48 and/or at destination waypoint 42.

In the exemplary embodiment, FMS 24 is configured to calculate a tactical performance envelope for aircraft 10 based at least on part on performance parameters such as, for example, engine performance, aircraft operational weight, and/or environmental factors (e.g. wind direction, wind speed, and/or air density). As used herein, the term "tactical performance envelope" refers to a range of operating capabilities with respect to a tactical command based on aircraft performance parameters. The range of operating capabilities may include, but are not limited to including maximum altitude, minimum altitude, maximum airspeed, minimum airspeed, maximum flight path angle, minimum flight path angle, maximum vertical speed, and/or minimum vertical speed.

In the exemplary embodiment, FMS 24 receives a tactical command 70 from ATC and will determine if the received tactical command is within the tactical performance envelop with respect to the received tactical command. FMS 24 will notify the pilot if the received tactical command is not within the tactical performance envelop and calculate second flight path trajectory 38 such that departure vector 50 and/or return vector 54 are within the tactical performance envelop. In one embodiment, the pilot may manually select a tactical command to operate aircraft 10 outside of the tactical performance envelop.

Figure 4:
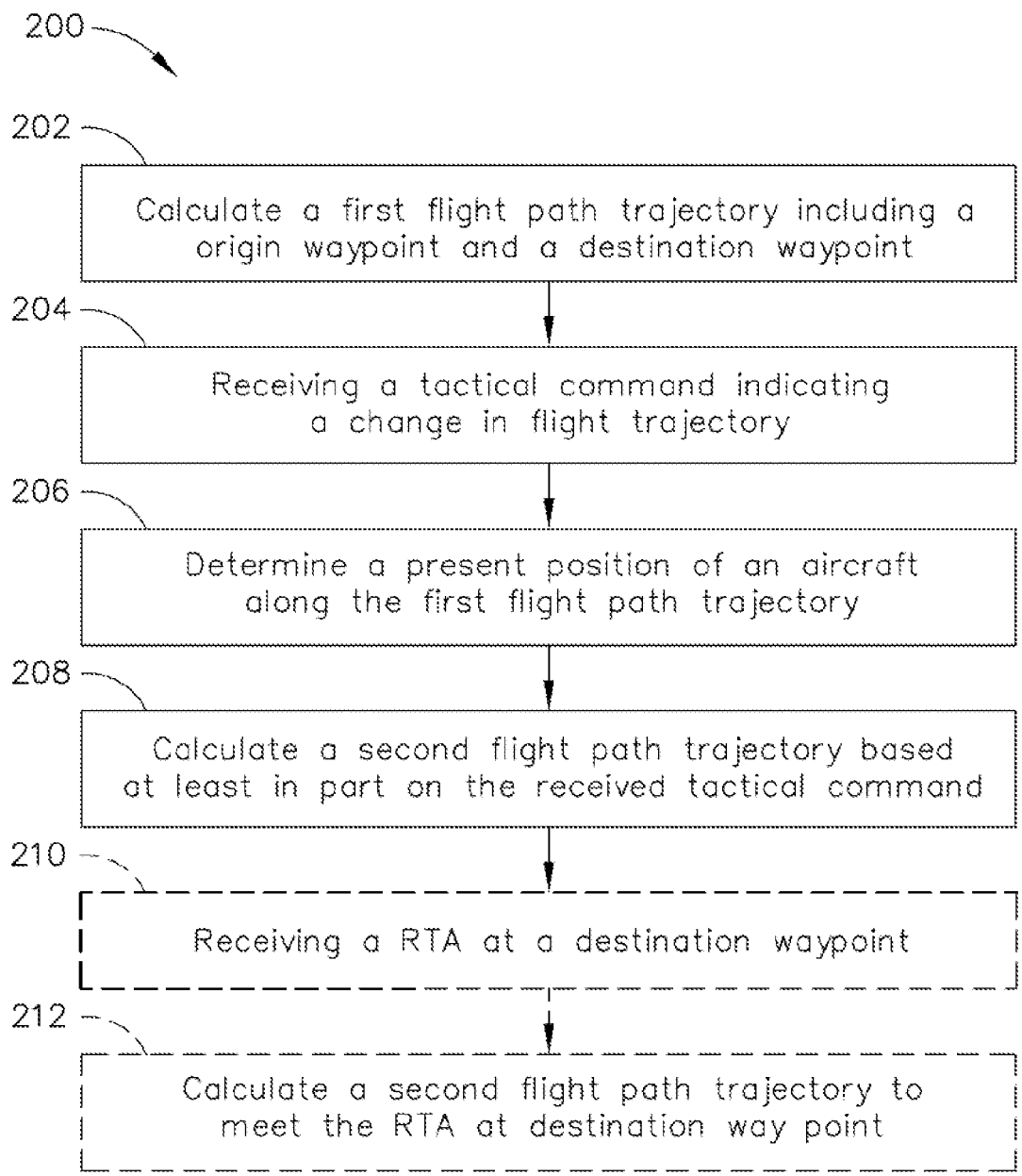
FIG. 4 is a flow diagram of an exemplary method of operating the aircraft shown in FIG. 1.

FIG. 4 is a flow diagram of an exemplary method 200 of operating aircraft 10. In the exemplary embodiment, method 200 includes calculating 202 first flight path trajectory 36 including origin waypoint 40 and destination waypoint 42. A tactical command indicating a change in flight trajectory is received 204 by FMS 24. FMS 24 determines 206 a present position of aircraft 10 along first flight path trajectory 36. FMS 24 also calculates 208 second flight path trajectory 38 based at least in part on the received tactical command, and including departure waypoint 46 along first flight path trajectory 36, intercept waypoint 48 along first flight path trajectory 36, departure vector 50 from departure waypoint 46, and return vector 54 from departure vector 50 to intercept waypoint 48.

In one embodiment, FMS 24 receives 210 a RTA at destination waypoint 42 from the ATC. FMS 24 calculates 212 second flight path trajectory 38 to meet the RTA at destination waypoint 42. Alternatively, FMS 24 receives a RTA at a selectable waypoint downstream of the current aircraft position, for example, at intercept waypoint 48, and calculates departure vector 50 to meet the RTA at intercept waypoint 48.

In an alternative embodiment, FMS 24 receives a first tactical command from the ATC, and calculates a period of time to complete second flight path trajectory 38 based on the received first tactical command, the aircraft's current position, target speed, wind and temperature data. FMS 24 calculates an ETA at destination waypoint 42 based on the calculated time to complete second flight path trajectory 38. FMS 24 transmits a signal indicative of the calculated ETA to the ATC. The ATC determines whether the calculated ETA is within a predefined range of RTA, and transmits a second tactical command to adjust the ETA to within the predefined range of RTA's. FMS 24 receives the second tactical command from the ATC and calculates second flight path trajectory 38 based on the received second tactical command to adjust the calculated ETA of second flight path trajectory 38 to within the predefined range of RTA's.

In one embodiment, FMS 24 receives a tactical command including heading vector command 60 and calculates departure vector 50 to maintain heading vector command 60 for a predefined period of time. FMS 24 calculates an amount of time to complete second flight path trajectory 38 and calculates an ETA to intercept waypoint 48. Alternatively, FMS 24 receives a RTA at destination waypoint 42 from the ATC, and calculates departure vector 50 to maintain heading vector command 60 for a period of time to meet the RTA at destination waypoint 42.

In an alternative embodiment, FMS 24 receives a tactical command including altitude vector command 66, calculates departure vector 50 to maintain the altitude vector command for a predefined period of time, and calculates an ETA to intercept waypoint 48. Alternatively, FMS receives a RTA at intercept waypoint 48 and calculates departure vector 50 to maintain the altitude vector command to meet the RTA at destination waypoint 42.

In one embodiment, FMS 24 receives a tactical command including an airspeed vector command 64. FMS 24 calculates second flight path trajectory 38 based on received tactical airspeed vector command 64, and calculates an amount of time to complete second flight path trajectory 38. In an alternative embodiment, FMS 24 receives a tactical command including altitude vector command 66, and calculates second flight path trajectory 38 based on the received altitude vector command 66, and calculates an ETA at intercept waypoint 48. In another alternative embodiment, FMS 24 receives a tactical command including flight path angle or vertical speed command 70, and calculates second flight path trajectory 38 based on the received flight path angle or vertical speed command 70.

Figure 5:
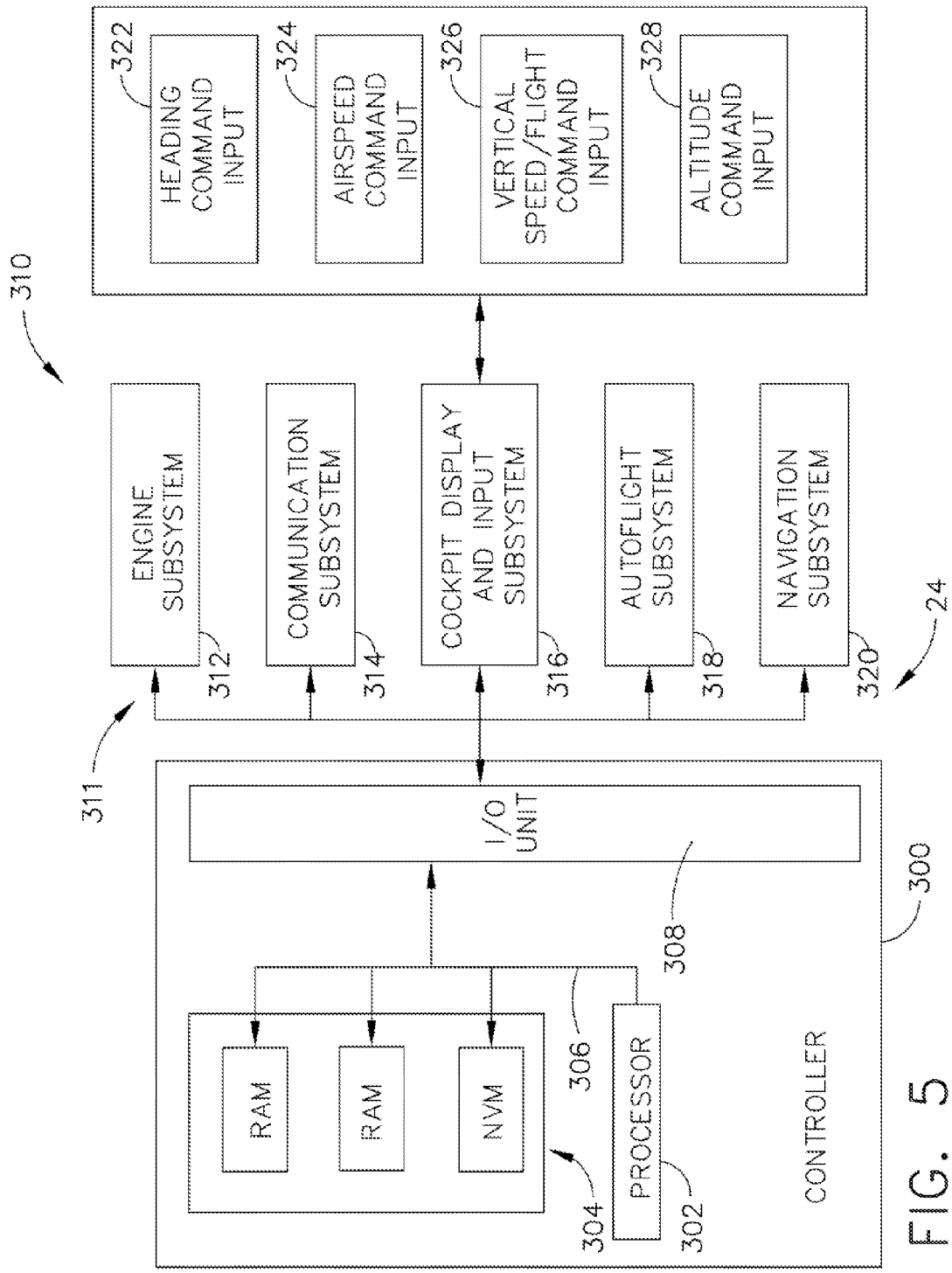
FIG. 5 is a simplified schematic diagram of the exemplary FMS suitable for use with the aircraft shown in FIG. 1.

FIG. 5 is a simplified schematic diagram of FMS 24. In the exemplary embodiment, FMS 24 includes a controller 300 that includes a processor 302 and a memory 304. Processor 302 and memory 304 are communicatively coupled via a bus 306 to an input-output (I/O) unit 308 that is also communicatively coupled to a plurality of subsystems 310 via a bus 311 or a plurality of dedicated buses. In various embodiments, subsystems 310 may include an engine subsystem 312, a communications subsystem 314, a cockpit display and input subsystem 316, an autoflight subsystem 318, a trajectory reference subsystem, and/or a navigation subsystem 320. Other subsystems not mentioned and more or fewer subsystems 310 may also be present.

In the exemplary embodiment, engine subsystem 312 is configured to generate autothrottle signals to control a speed of aircraft 10 using engines 12. Controller 300 is configured to receive input signals from one or more FMS subsystems and to generate signals that may be used to control the thrust of a gas turbine engine, torque and/or speed of an electric motor, or a power output of an internal combustion engine. Autoflight subsystem 318 is configured to control the flight surface actuators that change the path of aircraft 10 to follow the flight path trajectory 26 provided by FMS 24. Navigation subsystem 320 provides current location information to controller 300. Communications subsystem 314 provides communication between the ATC and controller 300 and for transmitting signals to the ATC, and for receiving signals from the ATC.

In the exemplary embodiment, cockpit display and input subsystem 316 includes the cockpit displays on which navigation information, aircraft flight parameter information, fuel and engine status and other information are displayed. Cockpit display and input subsystem 316 also includes various control panels from which the pilot or navigator may input tactical commands into FMS 24 after having received, for example, an appropriate message from an air traffic controller. As used herein, control panels refer to computer devices that interact directly with humans such as, but not limited to, a keyboard, a mouse, a trackball, a touchpad, a pointing stick, a graphics tablet, a joystick, a driving or flight simulator device, a gear stick, a steering wheel, a foot pedal, a haptic glove, and a gestural interface. In the exemplary embodiment, cockpit display and input subsystem 316 includes a heading command input 322 for receiving a heading vector command, an airspeed vector command input 324 for receiving airspeed vector command, a vertical speed/flight command input 326 for receiving an altitude vector command, and an altitude vector command input 328 for receiving an altitude vector command. Alternatively, cockpit display and input subsystem 316 includes any suitable tactical command inputs that enable FMS 24 to function as described herein.

While FIG. 5 illustrates a particular architecture suitable for executing method 300 (shown in FIG. 4) other architectures for FMS 24 can also be used.

In the exemplary embodiment, computer instructions for executing method 300 reside in memory 304 along with map, waypoint, holding pattern and other information useful for determining the desired flight paths, waypoints, turns and other aircraft maneuvers. As FMS 24 executes method 300 it uses information from navigation subsystem 320 and aircraft performance information stored in memory 304. Such information is conveniently entered by the pilot or navigator via cockpit display and input subsystem 316, received from the ATC, and/or obtained from non-transient computer-readable media, for example CD ROMs containing such information, signals received from offboard control systems, or a combination thereof.

In the exemplary embodiment, FMS 24 may be configured to command autoflight subsystem 318 to move the flight control surfaces of the aircraft without direct human intervention to achieve flight along flight path trajectory 26. Alternatively, if the autoflight is disengaged, FMS 24 can provide course change directions or suggestions to the pilot via, for example, display in cockpit display and input subsystem 316, which when followed by the pilot, causes the plane to fly along flight path trajectory 26. Controller 300 may be embodied in a standalone hardware device or may be exclusively a firmware and/or software construct executing on FMS 24 or other vehicle system.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 302, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is provided by an efficient, automated computation on an aircraft to replace manual, and often inaccurate computations that are currently performed by the air traffic controller. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

An exemplary technical effect of the system, method, and apparatus described herein includes at least one of: (a) calculating, by a flight management system, a first flight path trajectory including an origin waypoint and a destination waypoint; (b) receiving, by an aircraft flying in the first flight path trajectory, a tactical command indicating a change in flight trajectory; (c) determining a present position of the aircraft along the first flight path trajectory; (d) calculating, by the flight management system, a second flight path trajectory based at least in part on the tactical command.

The above-described embodiments of a flight management system for use with an aircraft provides a cost-effective and reliable means for providing an automated method to compute a flight path trajectory based on tactical commands in order to meet a required time of arrival at a waypoint ahead of the aircraft. More specifically, the methods and systems described herein facilitate determined the intent or future position of the aircraft by generating the flight path trajectory based on possible tactical commands. In addition, the above-described methods and systems facilitate reducing the uncertainty in flight time arrivals and the overall fuel consumption of aircraft in busy airspace that enable more precise aircraft separation and reducing controller workload. As a result, the methods and systems described herein facilitate operating aircraft in a cost-effective and reliable manner.

Exemplary embodiments of a method, system, and apparatus for a flight management system for use in an aircraft are described above in detail. The system, method, and apparatus are not limited to the specific embodiments described herein, but rather, components of systems and/or steps of the methods may be utilized independently and separately from other components and/or steps described herein. For example, the methods may also be used in combination with other flight management systems and methods, and are not limited to practice with only the aircraft engine systems and methods as described herein. Rather, the exemplary embodiment can be implemented and utilized in connection with many other propulsion system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flight management system for use in automatically generating a flight path trajectory for an aircraft, the flight path trajectory including a plurality of waypoints and a plurality of vectors extending between each waypoint of the plurality of waypoints, said flight management system comprising a processor configured to:
   calculate a first flight path trajectory including an origin waypoint and a destination waypoint;
   receive a tactical command indicating a change in flight trajectory; and
   calculate a second flight path trajectory based at least in part on the tactical command, the calculated second flight path trajectory including a departure waypoint along the first flight path trajectory, an intercept waypoint along the first flight path trajectory, and a departure vector from the departure waypoint to the intercept waypoint, wherein said processor is further configured to calculate the departure vector to meet a required time of arrival (RTA) at a selectable waypoint along the second flight path trajectory.

2. A flight management system in accordance with claim 1, wherein said processor is further configured to:
   receive a RTA at a merge waypoint along the first flight path trajectory; and
   calculate the second flight path trajectory to meet the RTA at the merge waypoint.

3. A flight management system in accordance with claim 1, wherein the tactical command includes a heading vector command, said processor further configured to calculate the second flight path trajectory including a departure vector that includes maintaining the heading vector for a predefined period of time.

4. A flight management system in accordance with claim 3, wherein said processor is further configured to calculate a period of time to maintain the heading vector to meet a RTA at the destination waypoint.

5. A flight management system in accordance with claim 1, wherein the tactical command includes an altitude vector command, said processor further configured to calculate the departure vector including maintaining the altitude for a predefined period of time.

6. A flight management system in accordance with claim 1, wherein the tactical command includes an airspeed vector command, said processor further configured to calculate the second flight path trajectory based on the tactical airspeed command.

7. A flight management system in accordance with claim 1, wherein the tactical command includes one of a flight path angle command and a vertical speed command.

8. A method of operating an aircraft including a flight management system, the method comprising:
   calculating, by the flight management system, a first flight path trajectory including an origin waypoint and a destination waypoint;
   receiving, by the aircraft flying in the first flight path trajectory, a tactical command indicating a change in flight trajectory; and
   calculating, by the flight management system, a second flight path trajectory based at least in part on the tactical command, the calculated second flight path trajectory including a departure waypoint along the first flight path trajectory, an intercept waypoint along the first flight path trajectory, and a departure vector from the departure waypoint to the intercept waypoint, wherein said processor is further configured to calculate the departure vector to meet a required time of arrival (RTA) at a selectable waypoint along the second flight path trajectory.

9. A method in accordance with claim 8, further comprising:
   receiving a RTA at a merge waypoint along the first flight path trajectory; and
   calculating the second flight path trajectory to meet the RTA at the merge waypoint.

10. A method in accordance with claim 8, further comprising:
    calculating the second flight path trajectory such that the departure vector is within a predefined tactical performance envelope.

11. A method in accordance with claim 8, further comprising:
    receiving a tactical command including a heading vector command;
    calculating the departure vector to maintain the heading vector command for a predefined period of time.

12. A method in accordance with claim 8, further comprising
    receiving a tactical command including an altitude vector command; and
    calculating the departure vector to maintain the altitude vector command for a predefined period of time.

13. A method in accordance with claim 8, further comprising receiving a tactical command including an airspeed vector command; and
    calculating the second flight path trajectory based on the tactical airspeed vector command.

14. A method in accordance with claim 8, further comprising:
 receiving a tactical command including a flight path angle command;
 calculating the second flight pan trajectory based on the flight path angle command.

15. An aircraft comprising:
 a flight management system comprising a processor, said processor configured to:
 calculate a first flight path trajectory including an origin waypoint and a destination waypoint;
 receive a tactical command indicating a change in flight trajectory; and
 calculate a second flight path trajectory based at least in part on the tactical command, the calculated second flight path trajectory including a departure waypoint along the first flight path trajectory, an intercept waypoint along the first flight path trajectory, and a departure vector from the departure waypoint to the intercept waypoint, wherein said processor is further configured to calculate the departure vector to meet a required time of arrival (RTA) at a selectable waypoint along the second flight path trajectory.

16. An aircraft in accordance with claim 15, wherein the tactical command includes a heading vector command, said processor further configured to calculate the second flight path trajectory including a departure vector that includes maintaining the heading vector for a predefined period of time.

17. An aircraft in accordance with claim 15, wherein the tactical command includes an altitude vector command, said processor further configured to calculate the departure vector including maintaining the altitude for a period of time.

18. An aircraft in accordance with claim 15, wherein the tactical command includes an airspeed vector command, said processor further configured to calculate the second flight path trajectory based on the tactical airspeed vector command.

19. An aircraft in accordance with claim 15, wherein the tactical command includes one of a flight path angle and a vertical speed command.

\* \* \* \* \*